(12) United States Patent
Boday et al.

(10) Patent No.: US 9,637,596 B2
(45) Date of Patent: May 2, 2017

(54) POLYHEMIAMINAL AND POLYHEXAHYDROTRIAZINE MATERIALS FROM 1,4 CONJUGATE ADDITION REACTIONS

(71) Applicant: International Business Machines Corporation, Armonk, NY (US)

(72) Inventors: Dylan J. Boday, Tucson, AZ (US); Mareva Fevre, San Jose, CA (US); Jeannette M. Garcia, San Jose, CA (US); James L. Hedrick, San Jose, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/642,920

(22) Filed: Mar. 10, 2015

(65) Prior Publication Data
US 2016/0264734 A1    Sep. 15, 2016

(51) Int. Cl.
| | | |
|---|---|---|
| *C09K 8/508* | (2006.01) | |
| *C08G 73/06* | (2006.01) | |
| *C09D 161/22* | (2006.01) | |
| *C08C 19/22* | (2006.01) | |
| *C08F 8/28* | (2006.01) | |
| *C09D 5/03* | (2006.01) | |
| *C08F 12/28* | (2006.01) | |
| *C08F 8/32* | (2006.01) | |
| *C08G 73/02* | (2006.01) | |

(52) U.S. Cl.
CPC .......... *C08G 73/0644* (2013.01); *C08C 19/22* (2013.01); *C09D 161/22* (2013.01); *C08F 8/28* (2013.01); *C08F 8/32* (2013.01); *C08F 12/28* (2013.01); *C08G 73/0273* (2013.01); *C08G 73/065* (2013.01); *C08J 2379/04* (2013.01); *C09D 5/03* (2013.01)

(58) Field of Classification Search
CPC .............. C08G 73/0644; C08G 73/065; C08G 73/0273; C08F 8/28; C08F 8/32
See application file for complete search history.

(56) References Cited

U.S. PATENT DOCUMENTS

| | | |
|---|---|---|
| 4,224,417 A | 9/1980 | Hajek et al. |
| 4,301,262 A | 11/1981 | Wagner et al. |
| 5,124,403 A | 6/1992 | Sasaki et al. |
| 5,290,893 A | 3/1994 | Hori et al. |
| 6,218,074 B1 | 4/2001 | Dueber et al. |
| 6,352,782 B2 | 3/2002 | Yeager et al. |
| 2015/0366202 A1 | 12/2015 | Boday et al. |
| 2016/0046803 A1 | 2/2016 | Boday et al. |
| 2016/0046831 A1 | 2/2016 | Boday et al. |

OTHER PUBLICATIONS

Garcia et al (Recyclable, Strong Thermosets and Organogels via Paraformaldehyde Condensation with Diamines, Science, vol. 344, Issue 6185, pp. 732-735, published on May 16, 2014.*
Shen et al., entitled, "Atom transfer radical polymerization of alkyl methacrylates using T-triazine as ligand", published in the Macromolecular chemistry and physics Journal, on Jul. 21, 2010, vol. 201, Issue: 11, pp. 1169-1175.
IBM U.S. Appl. No. 14/461,844, filed Aug. 18, 2014, entitled, 3D Printing With PHT/PHA Based Materials and Polymerizable Monomers.
IBM Continuation U.S. Appl. No. 14/564,973, filed Dec. 9, 2014, entitled, 3D Printing With PHT/PHA Based Materials and Polymerizable Monomers.
International Business Machines Corporation, "List of IBM Patents or Patent Applications Treated as Related," Oct. 19, 2015, 2 pages.

* cited by examiner

*Primary Examiner* — Gregory Listvoyb
(74) *Attorney, Agent, or Firm* — Patterson + Sheridan, LLP

(57) ABSTRACT

Polyhemiaminal (PHA) and polyhexahydrotriazine (PHT) materials are modified by 1,4 conjugate addition chemical reactions to produce a variety of molecular architectures comprising pendant groups and bridging segments. The materials are formed by a method that includes heating a mixture comprising solvent(s), paraformaldehyde, aromatic amine groups, aliphatic amine Michael donors, and Michael acceptors, such as acrylates. The reaction mixtures may be used to prepare polymer pre-impregnated materials and composites containing PHT matrix resin.

13 Claims, 3 Drawing Sheets

MICHAEL / 1,4 CONJUGATE ADDITION DONORS 101

MICHAEL / 1,4 CONJUGATE ADDITION ACCEPTORS 102

POLYHEMIAMINAL AND POLYHEXAHYDROTRIAZINE MATERIALS FROM 1,4 CONJUGATE ADDITION REACTIONS

FIELD

The present invention relates to methods of improving the physical properties of polyhemiaminal (PHA) and polyhexahydrotriazine (PHT) polymers and networks, and more specifically to preparing new polyhemiaminals (PHAs) and polyhexahydrotriazines (PHTs) with tailored macromolecular architectures for application in the field of composite materials.

BACKGROUND

PHAs and PHTs are an emerging class of high strength engineering thermosetting polymers that have a unique combination of properties. They have high modulus, solvent resistance, and resistance to environmental stress cracking, yet they can be easily recycled by decomposition to monomers in a strong acid. Unfortunately, some PHAs and PHTs are brittle and have poor impact resistance, which limits their applications.

There is a need for new lower cost functional PHA and PHT materials and composites which may be B-staged, or partially cured, and also combine the strengths of PHAs and PHTs, but with lower brittleness, higher impact resistance and a method of producing such materials and composites.

SUMMARY

PHA and PHT materials are modified by 1,4-conjugate addition chemical reactions to produce a variety of molecular architectures comprising pendant groups and bridging segments. The materials are formed by a method that includes heating a mixture comprising solvent(s), paraformaldehyde, aromatic amine groups, aliphatic amine Michael donors, and Michael acceptors, such as acrylates. The reaction mixtures may be used to prepare polymer pre-impregnated materials and composites containing PHT matrix resin. Specifically, embodiments of the disclosure include a PHT comprising a plurality of trivalent hexahydrotriazine groups having the structure

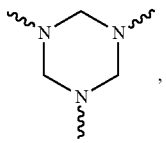

and a plurality of phenyl groups having the structure

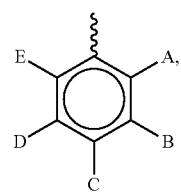

wherein each wavy bond site of a given hexahydrotriazine group is covalently linked at a respective wavy bond site of a phenyl group, and each wavy bond site of a given phenyl group is covalently linked at a respective wavy bond site of a hexahydrotriazine group, and wherein at least one of A, B, C, D, and E is a chemical group that is a reaction product of a 1,4-conjugate addition chemical reaction, and wherein at least one of A, B, C, D, and E is a Michael addition reaction product, more specifically, at least one of A, B, C, D, and E is a chemical group containing a Michael addition donor reaction product, wherein the Michael addition donor comprises a material selected from the group consisting of amines, thiols, sulphides, phosphines, phosphides carbanions, and alkoxides. The recited PHT comprises at least one of A, B, C, D, and E chemical groups containing a Michael addition acceptor reaction product, wherein the Michael addition acceptor is selected from the group consisting of alpha-beta unsaturated esters, acrylates, methacrylates, alkyl methacrylates, cyanoacrylates, acrylonitrile, acrylamides, maleimides, vinyl sulfones, vinyl sulfoxides, vinyl sulfones, vinyl ketones, nitro ethylenes, vinyl phosphonates, acrylonitrile, vinyl pyridines, azo compounds, beta-keto acetylenes and acetylene esters. PHTs of the disclosure further comprise of less than three Michael addition reaction products that are covalently bound pendant groups, while in other embodiments, each Michael addition reaction product covalently bridges at least one hexahydrotriazine group to another hexahydrotriazine group. In some embodiments, at least one of A, B, C, D, and E comprises a Michael addition reaction product having a polymeric segment selected from the group consisting of poly(amides), poly(carbonates), poly(esters), poly(ether ketones) poly(ethers), poly(etherimides), poly(imides), poly(olefins), poly(siloxanes), poly(sulfones), halogenated polymers, poly(phenylenes), poly(urethanes) and copolymers thereof, wherein at least one polymeric segment has a repeating unit of at least two. In further embodiments, the PHT comprises at least one polymer interpenetrating network, that includes a non-PHT polymer, and wherein the non-PHT polymer comprises at least one of the Michael addition reaction products, that may be a radical-initiated polymer. Embodiments of the disclosure elucidate a method of producing a PHT containing composite article, comprising: forming a mixture comprising a solvent, paraformaldehyde, an aromatic amine, a Michael addition donor, and a Michael addition acceptor; heating the mixture to a first temperature to produce a mixture of a first viscosity; coating a work piece with the mixture of the first viscosity to produce a prepreg; heating the prepreg to a second temperature to produce a B-stage prepreg of a second viscosity; cooling the B-stage prepreg; forming an article from the B-stage prepreg; and heating the article at a temperature from about 150° C. to about 280° C. to form a cured composite containing polyhexahydrotriazine. More specifically, in some embodiments the mixture of the first viscosity is produced at a temperature from about 20° C. to about 40° C., and the mixture of the first viscosity comprises covalently bonded Michael addition reaction products. The mixture of the first viscosity also may comprise covalently bonded Michael addition reaction products and PHA oligomers or polymers. The second temperature is about 40° C. to about 145° C., wherein the B-stage prepreg of the second viscosity comprises covalently bonded Michael addition reaction products and PHA oligomers or polymers. A PHT composite article produced by the method may also contain at least an interpenetrating polymer network comprising two or more polymers.

BRIEF DESCRIPTION OF THE FIGURES AND DRAWINGS

So that the manner in which the above recited features of the present disclosure can be understood in detail, a more particular description of the disclosure, briefly summarized above, may be had by reference to embodiments, some of which are illustrated in the appended drawings and in the body of the specification. It is to be noted, however, that the appended and embedded drawings illustrate only typical embodiments of this disclosure and are therefore not to be considered limiting of its scope, for the disclosure may admit to other equally effective embodiments.

FIG. 1 shows exemplary chemical compounds that may be used according to some embodiments of the disclosure.

Figure 1:
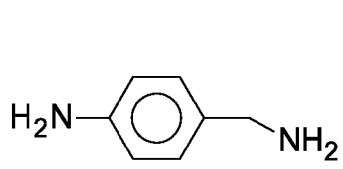
Figure 1:
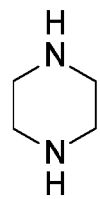
Figure 1:
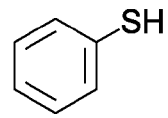
Figure 1:
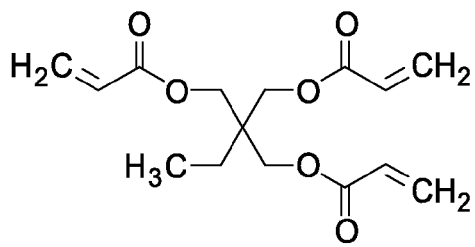
Figure 1:
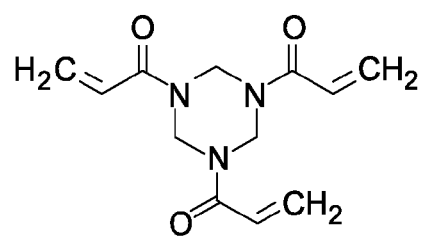
Figure 1:
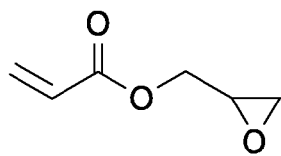
Figure 1:
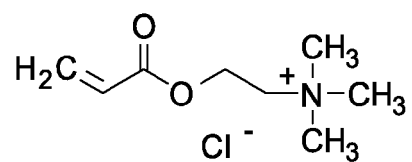
Figure 1:
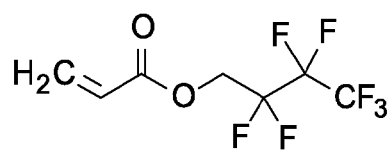
Figure 1:
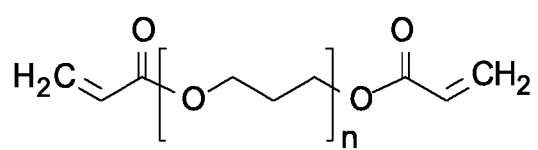
Figure 1:
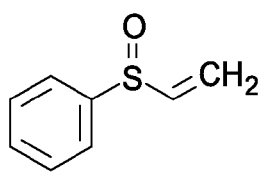
Figure 1:
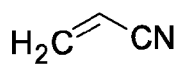
Figure 1:
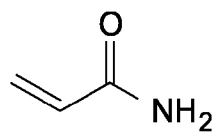

To facilitate understanding, identical reference numerals have been used, where possible, to designate identical elements that are common to the figures and drawings. It is contemplated that elements disclosed in one embodiment may be beneficially utilized on other embodiments without specific recitation.

DETAILED DESCRIPTION

New PHA and PHT materials and their methods of preparation are disclosed with properties that are useful in the field of composite materials. In particular, the new PHAs and PHTs may serve as a matrix resin in a polymer pre-impregnated mat (pre-preg) and for light-weight and high strength composites in the fields of electronics, automotive, and aerospace. To that end, Michael addition chemical reactions, a subset of 1,4 conjugate addition chemical reactions, are used to prepare modified PHA and PHT materials with improved properties.

As illustrated in reaction example 1, PHAs and PHTs may be prepared by the exemplary reaction of aromatic diamines (ODA), paraformaldehyde $(CH_2O)_n$ in N-methyl-2-pyrrolidone (NMP) solvent:

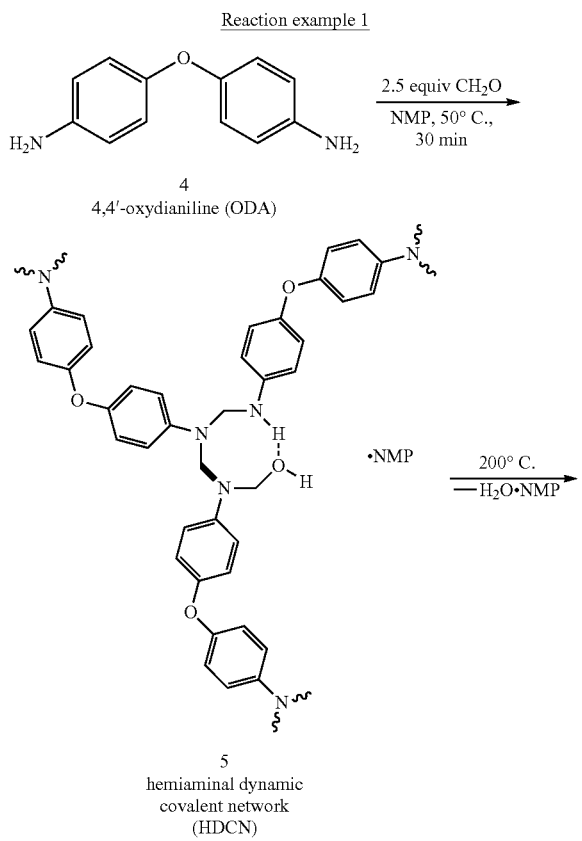

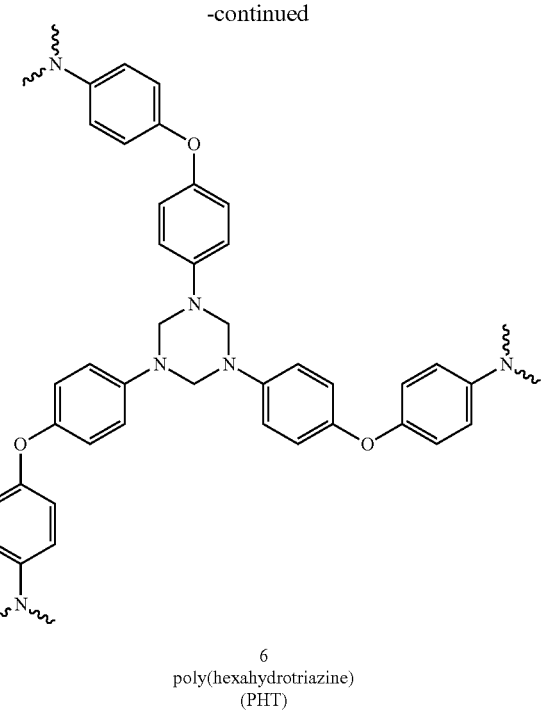

6
poly(hexahydrotriazine)
(PHT)

Per reaction example 1, the PHAs are generally prepared at a temperature from about 40° C. to about 60° C. The PHAs form films when cast from a polar aprotic solvents (e.g., NMP), and the PHA films are stable at a temperature from about 20° C. to less than about 150° C. The PHT films are formed by thermally treating a PHA film at a temperature of at least 150° C., preferably from about 165° C. to about 280° C., more preferably from about 180° C. to about 210° C., and most preferably from about 190° C. to about 210° C., and for a period of time of about 1 minute to about 24 hours, and more preferably about 1 hour. The PHT films can also have a high Young's modulus as measured by nanoindentation methods. In some instances, the Young's modulus of a PHT film can have a value in a range of about 8 GPa to about 14 GPa, exceeding that of bone (9 GPA). However, as mentioned prior, some PHTs suffer from poor impact resistance and brittleness, so there is a need for new modified PHTs for wider application.

The aromatic diamine (ODA), as shown reaction example 1, is a non-limiting component in the preparation of new modified PHAs and PHTs produced by Michael addition reactions. In general, the practitioner may choose any small molecule, oligomer, or polymer having an aromatic amine group in a PHA and/or PHT synthesis. The aromatic amine may include mono, di, tri, tetra, or penta amine functionality. The aromatic amine may be mono or polycyclic, and may include bridging groups, polymeric segments, and other chemical functionality, aromatic and/or aliphatic. The aromatic amine may contain inorganic elements and functionality such as phosphate, sulfate, and the like. The aromatic amine may have positively charged quaternary amines, and/or a plurality of plus or minus charges. The aromatic amine may include chemical functionality that participates in other chemical reactions, transformations, or interactions, including, but not restricted to: synthesis, decomposition, single replacement and double replacement, oxidation/reduction, acid/base, nucleophilic, electrophilic and radical substitutions, and addition/elimination reactions. In some embodiments, the aromatic amine may engage in polymerization reactions such as condensation, step growth, chain growth and addition polymerizations.

The aromatic amine may include one or more aliphatic amines, which may be primary and/or secondary, or mixtures thereof. Aromatic amines typically exhibit more preference for hexahydrotriazine formation compared to an aliphatic amine, and the aromatic amine typically does not interfere with a Michael addition reaction performed in its presence. For example, an aliphatic amine group may undergo an aza-Michael addition chemical reaction when in contact with an unsaturated hydrocarbon moiety (e.g., C═C double bond), that is in proximity of an electron withdrawing group such as carbonyl, cyano, or nitro. Specifically, the Michael addition is a reaction between nucleophiles and activated olefin and alkyne functionalities, wherein the nucleophile adds across a carbon-carbon multiple bond that is adjacent to an electron withdrawing and resonance stabilizing activating group, such as a carbonyl group. The Michael addition nucleophile is known as the "Michael donor", the activated electrophilic olefin is known as the "Michael acceptor", and reaction product of the two components is known as the "Michael adduct". Examples of Michael donors include, but are not restricted to: amines, thiols, phosphines, carbanions, and alkoxides. Examples of Michael acceptors include, but are not restricted to: acrylate esters, alkyl methacrylates, acrylonitrile, acrylamides, maleimides, cyanoacrylates and vinyl sulfones, vinyl ketones, nitro ethylenes, a,b-unsaturated aldehydes, vinyl phosphonates, acrylonitrile, vinyl pyridines, azo compounds, beta-keto acetylenes and acetylene esters. FIG. 1 shows a group of exemplary Michael donors 101 and a group of exemplary Michael acceptors 102.

Figure 2A:
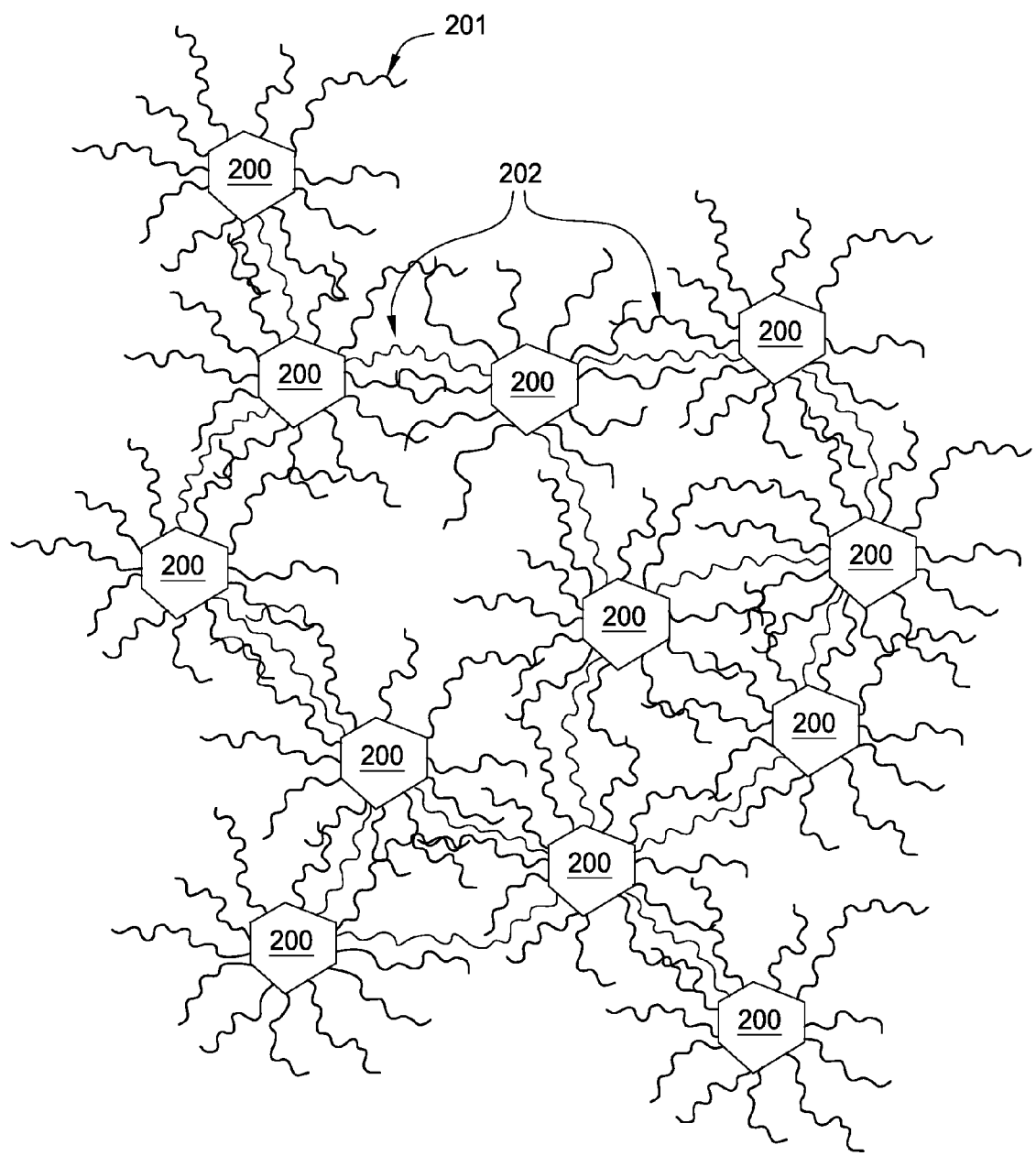
FIG. 2A is a representation of a polymer material structure according to one embodiment of the disclosure.

One such non-limiting example of a Michael addition reaction is shown below in reaction example 2, where 4-(2-aminomethyl)aniline (a Michael donor) is first reacted with lauryl acrylate (a Michael acceptor) to form the Michael adduct, and then is further reacted to form a PHT network with lauryl ester groups outboard. In other embodiments, a diamine such as ODA may be added to link the hexahydrotriazine moieties, and thus producing a hybrid macromolecular architecture that contains both hexahydrotriazine-lauryl ester pendant groups and hexahydrotriazine linking segments. FIG. 2A generally illustrates such a PHT network, comprising hexahydrotriazine moieties/domains 200, pendant groups 201, and linking segments 202, which may be polymeric. We note that the wavy lines attached to the hexahydrotriazine nitrogen atoms on this and further examples serves as an abbreviation and may represent pendant chemical groups or linking chemical segments.

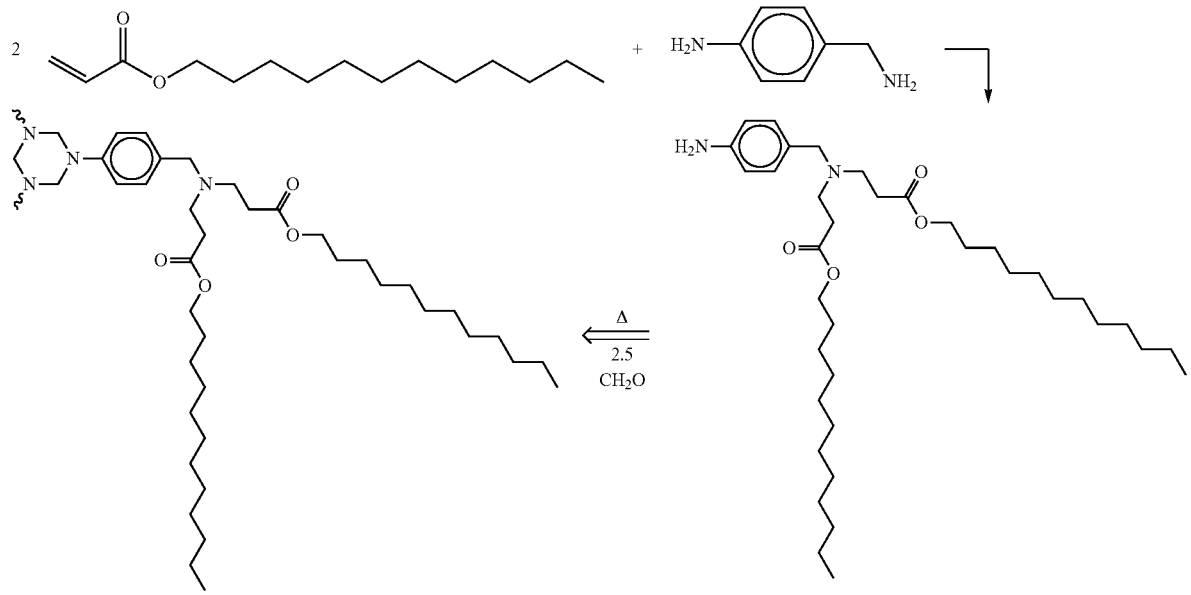

Reaction example 2

This embodiment and others, as generally illustrated in FIG. 2A, may form a toughened network comprising "soft" aliphatic domains of pendant Michael adducts and "hard" segments of PHT. In other embodiments, the Michael acceptor may be even larger or more bulky than a lauryl group, which may lead to more free volume within the PHA and/or PHT matrix, and may further define or delineate discrete domains. For example, the domains formed by pendant groups and linking segments may include crystallites and/or amorphous regions, and thus may serve as a means to modify the modulus of the bulk PHA/PHT material, or a composite material with PHT as the matrix resin. The domains may also exhibit specific melt and or glass transitions.

In other embodiments, hydrophilic/lipophilic balance of the pendant group(s) or linking group(s), may be modified for certain properties, such as modulus, adhesion to a substrate, or water repulsion/adsorption. The pendant group may be charged, like a phosphate group, and may engage in ionic interactions with a polar component in a composite material, such as a reinforcing fiber or mineral filler. In another embodiment, the pendant group may be a hydrogen bonding group, such as hydroxyl, which may engage in hydrogen bonding with a polar component. Interactions of these types may lead to increased adhesion of the PHA and/or PHT to the reinforcing fiber or mineral filler and may result in less cracking or delamination.

In another embodiment, as illustrated in reaction example 3, a star-like PHT material may be formed with covalently bound Michael adducts that are positively charged, for example the reaction product of 4-(aminomethyl)aniline and [2-(acryloyloxy)ethyl]trimethylammonium chloride, thus yielding a star-like structure(s). In other embodiments, a diamine such as ODA may be added to link the hexahydrotriazine moieties, thus producing a hybrid macromolecular architecture that contains both hexahydrotriazine pendant groups and hexahydrotriazine linking segments.

Reaction example 3

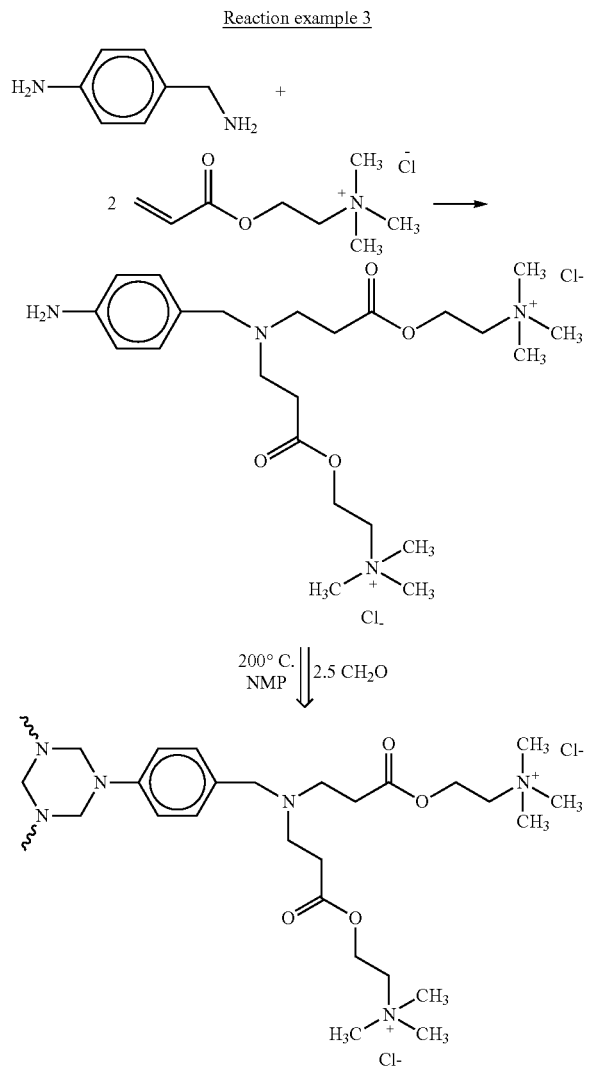

In some cases, after the formation of a PHA or a PHT network or polymer, the pendant or other matrix functionality may undergo further chemical reactions, as initiated by heat, light, or other means such as nucleophilic or electrophilic attack, or by free radical mechanisms of bond formation. For example, a PHT network may contain a Michael adduct comprising epoxy, vinyl, sulfone, or anhydride functionality, that is useful for a second chemical reaction that may form more covalent bonds.

In other embodiments, additional synergists and initiating chemistries may be added to the mixture to react the pendant or integrated matrix functionality. For example, excess or left over starting materials may be further reacted or consumed by addition of a free radical initiator to the reaction mixture before, during or after PHA and/or PHT matrix formation. For example, and in reference to reaction example 2,4-(2-aminomethyl)aniline (Michael donor) is reacted with lauryl acrylate (Michael acceptor) to form the Michael adduct. The adduct may be further reacted with paraformaldehyde to form a PHT matrix under conditions similar to reaction example 1. However, because of possible steric constraints imposed by the desired functional group, and the limits of diffusion, some acrylate material may remain unreacted and trapped as a liquid within the hardened PHT matrix, and thus may be further chemically reacted or polymerized as needed. In related embodiments, the Michael acceptor and/or donor may be in excess of a theoretical stoichiometric value, and may also serve as the reaction solvent. To chemically react or consume the aforementioned excess material, such as an acrylate, the practitioner may choose to add a photoinitiator to the reaction mixture, such as an Irgacure® product manufactured by BASF of Ludwigshafen, Germany, and then after PHA or PHT film formation, irradiate the film with an appropriate wavelength of ultraviolet (UV) light to effect a final cure, or post-cure, which may produce an interpenetrating acrylic network within the PHA or PHT host. Generally, photoinitiators for UV cured coatings and adhesives are compounds that, under absorption of light, such as that from a mercury lamp at a specific wavelength, undergo a photoreaction, producing reactive species that are capable of initiating the polymerization of the unsaturated constituents in a formulation.

In other embodiments, a thermally activated free radical initiator may be used to react acrylic and other unsaturated chemistry within a PHA or PHT matrix to form an interpenetrating polymer network and/or to build viscosity. Examples of suitable free radical initiators generally include azo, and the inorganic and organic peroxides. Those skilled in the art may choose a suitable initiator wherein half the mass of the molecule decomposes to free radical species over a time period (half-life) and at a suitable temperature. In one embodiment, the Michael addition reaction occurs at a first temperature, for example about 25° C., and during a first time, about 0.5 hour, and then reaches completion. Excess acrylate may then be consumed by a free radical initiator at a second temperature at which the free radicals are generated by initiator decomposition. In this fashion, acrylate oligomers and/or polymers are produced in the reaction mixture. One example of an azo initiator is 1,1'-azobis(cyclohexane-1-carbonitrile), an azo initiator soluble in NMP and having high temperature decomposition (10 hour half-life, 88° C.), available from WAKO Chemicals, USA. In one example, after the Michael reaction has reached completion, an azo initiator in the amount of about 1% to about 5% by weight of acrylate, is added to the reaction mixture to react or polymerize a predetermined amount of over stoichiometric acrylate moieties, and wherein the acrylate may also serve as a reaction solvent or impart solvency for the reaction mixture components. Further heating of the reaction mixture will thus produce a polymer produced by free-radical chemistry, then PHA, and then finally PHT. In another example, azo initiator in the amount of about 2% by weight of acrylate is added to the reaction mixture to react unreacted acrylate that is not in great excess or used as a solvent. In these and similar embodiments, the modulus and strength of the material may be modified by this technique, and/or viscosity of the reaction mixture may be increased to aid further processing, such as a coating step, where the mixture is applied to a fiberglass mat substrate. It should also be appreciated that an article comprising an interpenetrating network, such as an olefinic polymer within a PHT matrix, may produce a material that is plasticized by the olefinic component and therefore may exhibit less brittleness and more flexibility.

One may choose to add a variety of reactive elements, molecular building blocks, and initiating chemistries to a reaction vessel prior to and during the synthesis of a PHA or PHT, to effect further cure of the reactive matrix components, and thus form cross-links, and/or interpenetrating network(s) comprising PHA and/or PHT, and one or more additional curable and/or polymeric components, some derived from a Michael addition reaction. As discussed prior, while photo and thermal free radical initiators may be used to effect a cure during and after PHA and/or PHT matrix formation, other methods may be available, including heat or light induced ring closure, such as a Diels-Alder (DA) reaction or other annulations or cycloadditions. A DA reaction is a [4+2]-cycloaddition of a conjugated diene and a dienophile. Advantageously, a Michael acceptor molecule such as an acrylate is a useful dienophile in a DA type reaction, and may be used to covalently attach to a PHA and or PHT network that contains a conjugated diene moiety, such a cyclopentadiene (CP) group. In one example, a DA reaction may occur during the formation of a PHT network from about 150° C. to about at about 200° C., wherein a CP group reacts with an acrylate group and thus forms a cyclic cross-link and/or a branch.

Figure 2B:
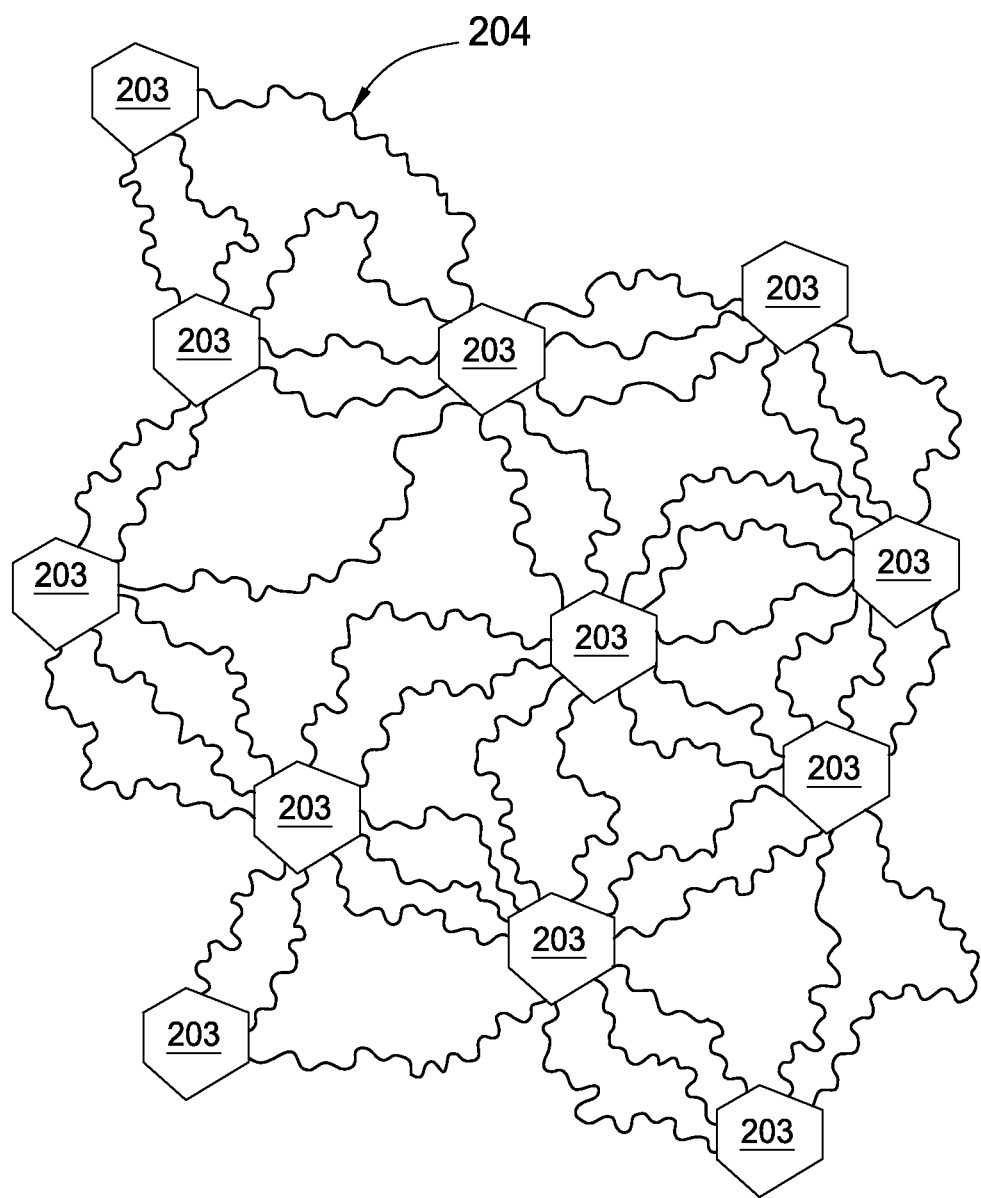
FIG. 2B is a representation of a polymer material structure according to another embodiment of the disclosure.

Reaction example 4 illustrates an embodiment wherein a difunctional Michael acceptor is used to create a novel PHA and/or PHT material, which may have PHA and/or PHT domains covalently bridged by segments comprising the Michael adducts.

polymeric moiety, with no lower or upper limit on molecular weight. For example, R may be a poly(ether) segment —(CH$_2$CH$_2$O)$_n$—. Other non-limiting examples of oligomeric and/or polymeric R groups include poly(amide), poly (carbonate), poly(ester), poly(ether ketone), poly(ether), poly(etherimide), poly(imide), poly(olefin), poly(siloxane), poly(sulfone), halogenated polymers, poly(phenylene), poly (urethane) and their copolymers. A representation of such a toughened and less brittle PHT network is generally illustrated in FIG. 2B, which includes hexahydrotriazine moieties/domains 203, and linking R groups or segments 204.

In other embodiments a first polymer bridging group R may be a first polymer, while a second polymer bridging group R is a second polymer different from the first polymer. In some embodiments, the first polymer and the second polymer may be the same polymer, but may have different molecular weights. In this way, a PHT or a PHA matrix may display multiple polymer melt transitions and/or glass transition temperatures as a function of the R linking groups or segments. It is further noted that any number of different Michael acceptors and/or mixtures may be used in these methods and compositions. For example, the Michael acceptor may be mono, di, tri, and tetra functional, and each group R may have different molecular weights, chain lengths, and molecular structures. Of further note and benefit, the oligo-

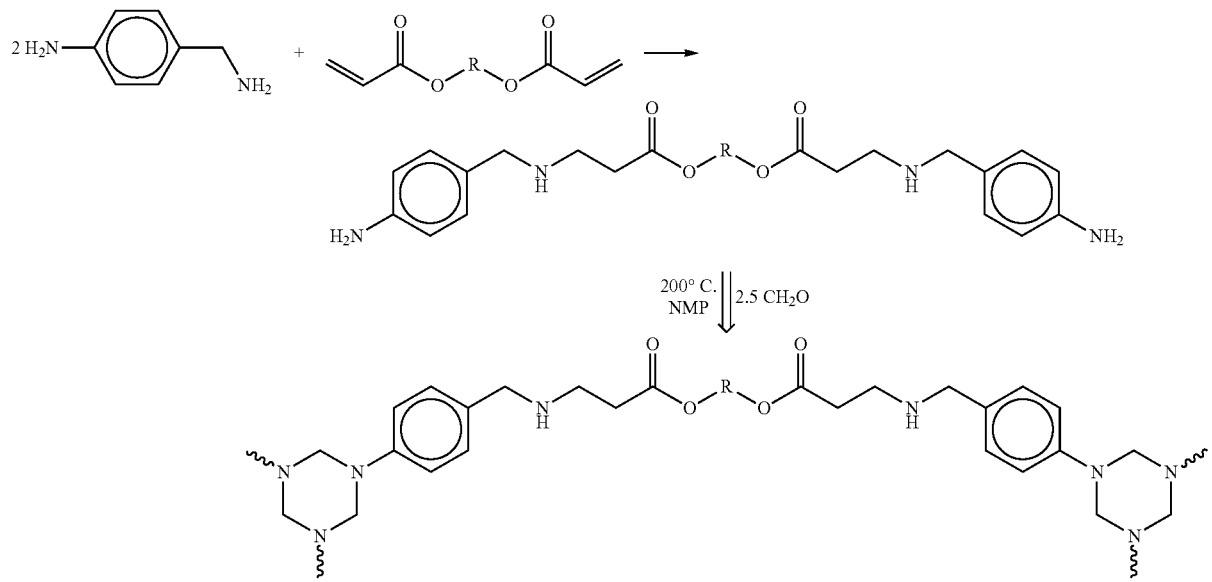

Reaction example 4

As shown in reaction example 4, the difunctional Michael acceptor comprises bridging molecular structure or segments "R", which may be aliphatic, aromatic, or both, and may contain chemical functionality that may engage in other chemical reactions, transformations, or interactions, including, but not restricted to: synthesis, decomposition, single replacement and double replacement, oxidation/reduction, acid/base, nucleophilic, electrophilic and radical substitutions, and addition/elimination reactions. In some embodiments, the R bridging segment may also engage in polymerization reactions such as condensation, step growth, chain growth and addition polymerizations. The various R groups may be the same or different.

In one non-limiting example, R=is a methylene group, —CH$_2$—. In other embodiments, R may be an oligomeric or meric and/or polymeric R groups may adhere to or wet out composite fillers such as fibers and mineral fillers, thus further strengthening a composite product and decreasing brittleness.

In another embodiment, a non-limiting acrylic elastomer is used to produce a PHT network with some flexibility and some elongation, as represented by reaction example 5. Herein, the aromatic amine may include two aliphatic amine Michael donors and one aromatic amine for hexahydrotriazine formation, and the aliphatic Michael donor contains at least two primary or secondary aliphatic amine groups that may be reacted with a diacrylate acceptor, such as poly (butadiene) diacrylate. This may be termed a Michael addition polymerization, resulting in a macromolecular architecture comprising PHA or PHT domains bridged by soft rubber-like domains, as generally illustrated in FIG. 2B.

Reaction example 5

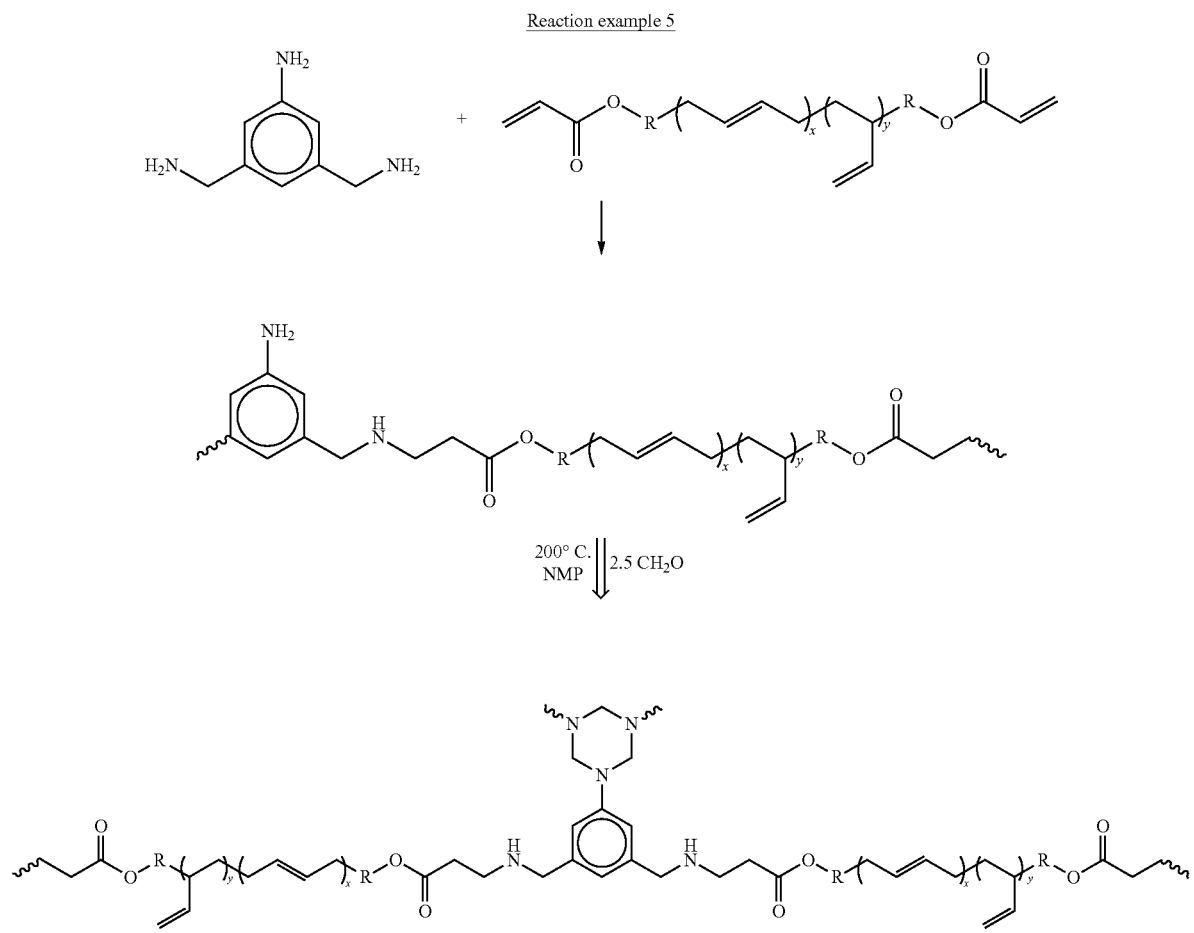

In other embodiments, the residual double bonds in the poly(butadiene) segment (x,y) are further reacted to create cross-links which may lead to reversible elastomeric properties. The segments x and y may be at least 1 segment or repeating unit. Examples of some cross-linking chemistries include sulfur vulcanization and peroxide, such as tert-butyl perbenzoate, dicumyl peroxide, benzoyl peroxide, di-tert-butyl peroxide and the like. In other embodiments, the modified PHT polymer, for example a rubber modified PHT polymer, may be recycled for other uses by exposure to an acidic solution at a pH of about 3 or less. The acidic solution may selectively depolymerize the hexahydrotriazine moieties to Michael adduct precursors, and the degree of depolymerization may be controlled by selecting the pH and depolymerization time. In this way a modified PHT polymer may be softened, and viscosity may be reduced as desired.

The polymer bridging groups derived from the Michael adducts impart some molecular-scale flexibility to the PHT or PHA polymer network owing to the reduced cross-link density, resulting in increased toughness and impact resistance to the material, which are useful properties in composite applications. A narrow distribution of molecule sizes in the polymer bridging groups provides maximum efficiency of adding impact resistance per mole of polymer bridging groups added. When the Tg is below room temperature (~23° C.), longer polymer chains added to the polymer network may provide more toughness than shorter chains, so in a broad molecular weight distribution of polymer bridging groups, the short chains may have less effect on impact resistance and toughness than the longer chains.

General reaction conditions and procedures for PHA and PHT polymers including covalently bound Michael adducts and/or interpenetrating networks comprised of one or more oligomeric or polymeric components are as follows:

(1) The solvent can be any suitable solvent. Useful solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). Alternatively, the Michael acceptor, such as an acrylate, may serve as the solvent, and the solvent may be polymerized before, during, or after other steps in the process, such as PHA and/or PHT formation.

(2) Under inert dry conditions, the Michael donor (aliphatic amine) may be added to the above solvent, containing the Michael acceptor in a 1:1 molar ratio (1 mole of aliphatic amine:1 mole of double bond). In such a reaction, a temperature may range from about 20° C. to about 30° C., and over a time period from about 15 minutes to 5 hours. One such example is reaction example 6, shown below, wherein the Michael donor, ethanolamine, smoothly reacts with the trifunctional Michael acceptor, 1,3,5-triacryloylhexahydro-1,3,5-hexahydrotriazine to form the star-like Michael adduct:

Reaction example 6

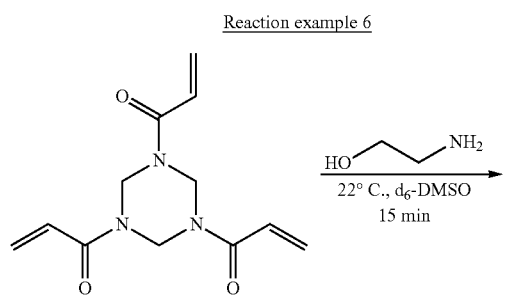

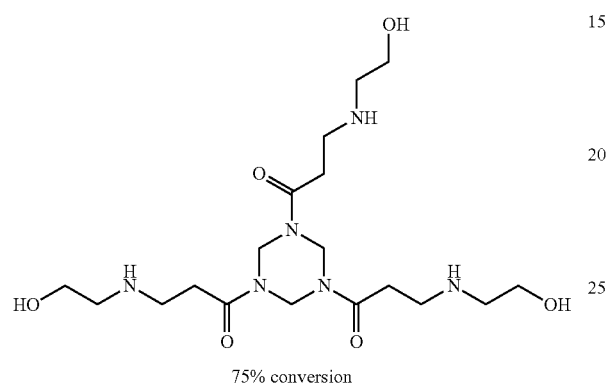

75% conversion

Alternatively, the molar ratio may be adjusted so that there is a "limiting reagent" or one reagent is in excess. As in (1) above, the acrylate or Michael acceptor may be in excess and serve as the solvent. Excess acrylate and/or other sites of unsaturation may be reacted in later steps using free radical or other chemistries initiated by heat or light.

(3) The reaction mixture of (2) may comprise a mixture of aromatic amines for hexahydrotriazine formation, and/or other amines, both aromatic and aliphatic, in some combination. In one non-limiting example, the mixture may contain multiple Michael donors, for example, a difunctional aliphatic diamine such as piperazine and a difunctional aromatic amine such as 4-(2-aminomethyl)aniline. In this example, reaction example 7, piperazine (difunctional Michael donor) chemically reacts with 1,4-butanediol diacrylate (difunctional Michael acceptor) to form an amino functionalized poly(amino ester) in a Michael addition polymerization. The amino functionalized poly(amino ester) thus produced contains aromatic amine end groups that are available for further reaction with formaldehyde for production of PHA, PHT, or mixtures thereof.

Reaction example 7

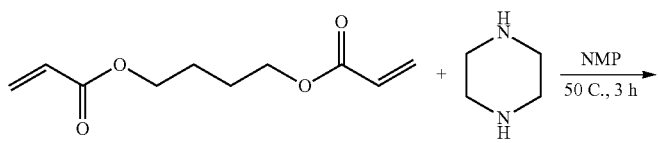

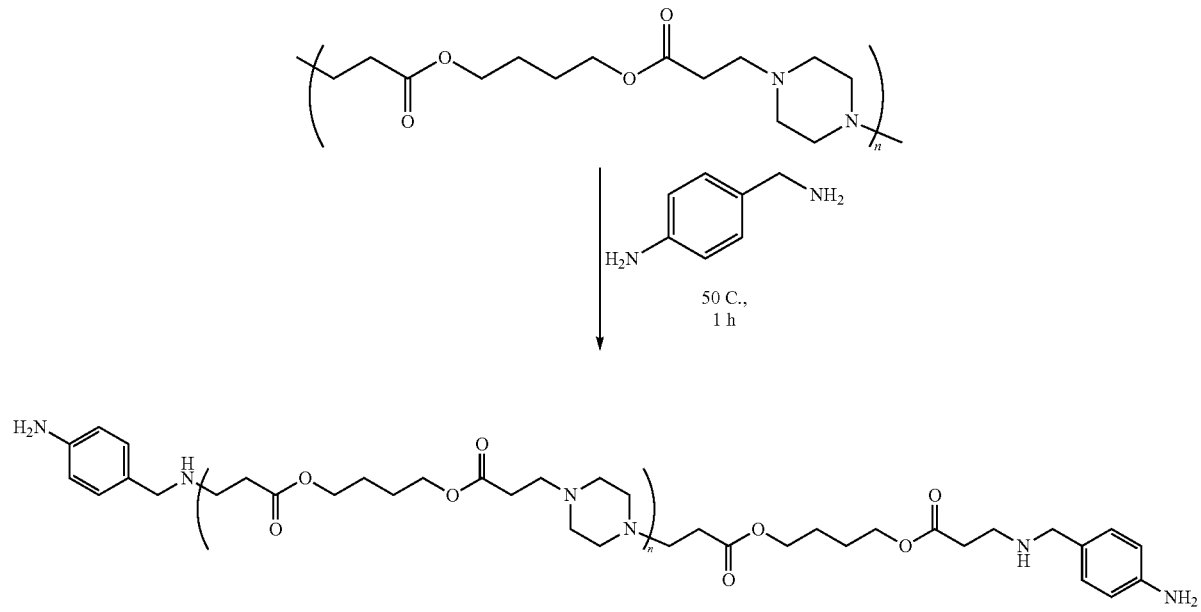

Mixture 1

Experimental details for the preparation of the poly(amino ester) of reaction example 7 are as follows: piperazine (0.1 g, 1.16 mmol) and 1,4-butanediol diacrylate (0.236 g, 1.19 mmol) were stirred at 50° C. in 0.4 mL N-methylpyrrolidone (NMP) for 3 hours. 4-aminobenzylamine (0.02 g, 0.16 mmol) was added next, and the mixture was kept at 50° C. for 1 hour.

As mentioned prior, the poly(amino ester) product reaction of example 7 contains aromatic amine end groups that may be used for production of a PHT in a subsequent step. Non-limiting experimental details for the preparation of a PHT from the poly(amino ester) of reaction example 7 and the bridging diamine, 4,4'-oxydianiline (ODA), are as follows: ODA (0.2 g, 1 mmol) and paraformaldehyde (0.1 g, 3.33 mmol) were stirred at 50° C. in 1.5 mL NMP until the solution became clear (~15 minutes). Then 0.2 g of the poly(amino ester) mixture (~32 wt % of poly(amino ester) vs. ODA) was added, and the solution was stirred at 50° C. for 1 minute. The solution was then deposited on a glass microscope slide with aluminum tape (80 μm thickness) boundaries using a glass Pasteur pipette. The following thermal treatment was used to drive off the solvent and cure the film: 50° C. for 1 hour, 50° C. to 110° C. over 1 hour, 110° C. for 1 hour, 110° C. to 200° C. over 1 hour, and then 200° C. for 1 hour, after which time the film was allowed to cool to ~23° C. The aluminum tape was carefully peeled off the slide and the PHT film was floated from the glass plate by soaking in deionized water. A differential scanning calorimetry experiment revealed a $T_g$ of 149° C.

(4) Per reaction example 7, PHT formation may occur in a separate step or addition as described, while in other embodiments the reaction mixture may contain all the necessary components to perform a "one-pot" synthesis of a PHA and/or PHT polymer comprising covalent groups produced from Michael addition reactions. For example, all the components of reaction example 7 may be all combined in one reaction vessel with ODA and paraformaldehyde to produce a PHT. Those schooled in the art will appreciate that the temperature(s) of the reaction vessel will need to be controlled as each component is reacted. In another example, a reaction vessel padded with nitrogen may be charged with a dry and degassed solvent, paraformaldehyde (PF), lauryl acrylate, and 4-(2-aminomethyl)aniline. In some embodiments, the acrylate may serve as the solvent, or may be co-solvent. The mole ratio of aliphatic amine to acrylate may be about 1.0:1.2, or wherein the acrylate is in some excess, and the moles of PF are sufficient to form PHA/PHT hexahydrotriazine structures (ex. 0.5 mole aromatic amine: 1.25 mole PF). The above mixture may warmed to between about 20° C. and about 30° C. to effect the Michael addition reaction, which may concurrently build mixture viscosity, and in some cases may not substantially initiate the reaction of the aromatic amine with the PF. Then, over a time period from about 0.5 hours and about 1 hour, the mixture may be further heated to between about 30° C. and about 50° C. to cause the reaction of the aromatic amine with PF, and thus produce a PHA material over a time period from about 1 hour to about 24 hours. In this embodiment and others, the PF serves as a "thermal latent curing agent", that is, it does not undergo reaction with the aromatic amine to form hexahydrotriazine structures until heated to a higher temperature.

In other embodiments the PHA material may be converted directly to a PHT product without isolating the PHA material. To that end, the reaction mixture may heated from about 190° C. to about 210° C. for a period of time of about 1 minute to about 24 hours, for example about 1 hour. In summary of conditions 1-4 above, in a "one-pot" preparation of PHA and/or PHT, the Michael addition may occur first under more mild conditions, and then after further heating, the PF will react with the aromatic amine to form a PHA and/or PHT material.

In one embodiment, a composite article may be produced using the reaction mixture and method(s) as described. Here, the Michael addition reaction is first performed from about 20° C. to about 30° C. for a period of time of about 1 hour to build viscosity for the application of the mixture to a fiberglass or carbon fiber mat. Alternatively, a reaction mixture may be produced comprising the reaction products of both Michael addition and PHA formation, by heating the mixture from about 30° C. to about 60° C. for a time period until a desired working viscosity is obtained. The mixture may be then applied to the fiber mat, and thus impregnate the fiber mat with the partially cured mixture. The fiber mat thus produced may be known as a polymer pre-impregnated mat (pre-preg). At this juncture, excess partially cured resin and other components may be removed from the prepreg by a squeegee, and then the prepreg may be subjected to further heat to achieve a certain desired stage of cure, followed by cooling (quench) to stop the chemical reaction(s), and so that the material may be handled for later steps in the composite preparation process. This composite precursor article may be termed a "B-stage" pre-preg, wherein the resin mixture is partially cured, maintains some flexibility, and may be handled for further transport and/or processing. The B-stage pre-preg may comprise of Michael adducts, PF, PHA oligomers and polymers and other reaction components. At this stage the B-stage pre-preg may be used to create a composite article in a mold. The fully cured article may be produced by heating to about 200° C. in a vacuum autoclave to complete the reaction of the amine components with the thermal latent PF in the mixture, remove solvent, and thereby produce a composite with PHT matrix resin.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

The invention claimed is:

1. A polyhexahydrotriazine (PHT), comprising:
a plurality of trivalent hexahydrotriazine groups having the structure

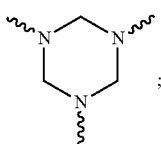

and
a plurality of phenyl groups having the structure

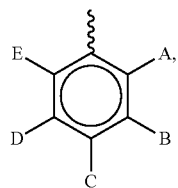

wherein each wavy bond site of a given hexahydrotriazine group is covalently linked at a respective wavy bond site of a phenyl group, and each wavy bond site of a given phenyl group is covalently linked at a respective wavy bond site of a hexahydrotriazine group, and wherein at least one of A, B, C, D, and E is a chemical group that is a reaction product of a 1,4 conjugate addition chemical reaction.

2. The PHT of claim 1, wherein at least one of A, B, C, D, and E is a Michael addition reaction product.

3. The PHT of claim 2, wherein at least one of A, B, C, D, and E is a chemical group containing a Michael addition donor reaction product.

4. The PHT of claim 3, wherein the Michael addition donor comprises a material selected from the group consisting of amines, thiols, sulphides, phosphines, phosphides carbanions, and alkoxides.

5. The PHT of claim 2, wherein at least one of A, B, C, D, and E is a chemical group containing a Michael addition acceptor reaction product.

6. The PHT of claim 5, wherein the Michael addition acceptor is selected from the group consisting of alpha-beta unsaturated esters, acrylates, methacrylates, alkyl methacrylates, cyanoacrylates, acrylonitrile, acrylamides, maleimides, vinyl sulfones, vinyl sulfoxides, vinyl sulfones, vinyl ketones, nitro ethylenes, vinyl phosphonates, acrylonitrile, vinyl pyridines, azo compounds, beta-keto acetylenes and acetylene esters.

7. The PHT of claim 2, wherein less than three Michael addition reaction products are covalently bound pendant groups.

8. The PHT of claim 7, wherein each Michael addition reaction product covalently bridges at least one hexahydrotriazine group to another hexahydrotriazine group.

9. The PHT of claim 2, wherein at least one of A, B, C, D, and E comprises a Michael addition reaction product having a polymeric segment selected from the group consisting of poly(amides), poly(carbonates), poly(esters), poly(ether ketones) poly(ethers), poly(etherimides), poly(imides), poly(olefins), poly(siloxanes), poly(sulfones), halogenated polymers, poly(phenylenes), poly(urethanes) and copolymers thereof.

10. The PHT of claim 9, wherein at least one polymeric segment has a repeating unit of at least two.

11. The PHT of claim 2, comprising at least one polymer interpenetrating network.

12. The PHT of claim 11, wherein the polymer interpenetrating network comprises a non-PHT polymer, and the non-PHT polymer comprises at least one of the Michael addition reaction products.

13. The PHT of claim 12, wherein the non-PHT polymer is a radical-initiated polymer.

* * * * *